US006917257B2

(12) United States Patent
Gondi

(10) Patent No.: US 6,917,257 B2
(45) Date of Patent: Jul. 12, 2005

(54) APPARATUS AND METHOD FOR EQUALIZING RECEIVED SIGNALS

(75) Inventor: Srikanth Gondi, Los Angeles, CA (US)

(73) Assignee: Texas Instruments Incorporated, Dallas, TX (US)

( * ) Notice: Subject to any disclaimer, the term of this patent is extended or adjusted under 35 U.S.C. 154(b) by 88 days.

(21) Appl. No.: 10/458,519

(22) Filed: Jun. 10, 2003

(65) Prior Publication Data

US 2004/0251982 A1 Dec. 16, 2004

(51) Int. Cl.[7] .............................................. H03F 3/45
(52) U.S. Cl. .................. 333/28 R; 333/24 R; 330/109; 330/254; 375/229
(58) Field of Search ............................... 333/28 R, 18, 333/24 R; 330/109, 252, 254, 126, 304; 375/229, 232

(56) References Cited

U.S. PATENT DOCUMENTS

| | | | |
|---|---|---|---|
| 5,708,391 A | * | 1/1998 | Altmann et al. ............ 330/252 |
| 5,940,441 A | | 8/1999 | Cranford |
| 5,978,417 A | | 11/1999 | Baker |
| 6,169,764 B1 | | 1/2001 | Babanezhad |

OTHER PUBLICATIONS

M.H. Shakiba, "A 2.5 Gb/s Adaptive Cable Equalizer", IEEE Solid–State Circuits Conference Digest of Technical Papers; pp. 396–397, 1999.

S. Gondi, R. Geiger, J. Liu, J. Bareither, S. Sterrantino and E. Pace, "A 2V Low–Power 125 Mbaud Repeater Architecture for UTP5 Cables", European Solid–State Circuits Conference, Sep. 2002, 4 pages.

A.J. Baker, "An Adaptive Cable Equalizer for Serial Digital Video Rates to 400 Mb/s", IEEE Solid–State Circuits Conference Digenst of Technical Papers; pp. 174–175, 1996.

* cited by examiner

*Primary Examiner*—Daniel D. Chang
(74) *Attorney, Agent, or Firm*—W. Daniel Swayze, Jr.; W. James Brady; Frederick J. Telecky, Jr.

(57) ABSTRACT

An apparatus for equalizing input signals including high and low frequency component signals received at an locus includes: (a) a first signal amplifying circuit coupled with the input locus, blocking the low frequency component signals and amplifying the high frequency component signals by a first gain to present a first amplified signal; the first gain is established by a relationship between at least two resistance elements in the first signal amplifying circuit; (b) a second signal amplifying circuit coupled with the input locus amplifying the input signal by a second gain to present a second amplified signal; and (c) a combining circuit combining the first amplified signal and the second amplified signal to present an output signal representative of the input signal at an output locus.

19 Claims, 4 Drawing Sheets

APPARATUS AND METHOD FOR EQUALIZING RECEIVED SIGNALS

BACKGROUND OF THE INVENTION

The present invention is directed to equalizer circuits, and especially to adaptive equalizer circuits for use in equalizing received signals that have been conveyed over a length of a transmission medium, such as a communication cable. The present invention may be advantageously employed for equalizing a received signal that includes high frequency and low frequency component signals. The present invention is especially useful in equalizing communication signals received over a cable or similar signal conveyance. The exemplary embodiment of the present invention disclosed herein is an equalization apparatus in a receiver in a data communication system that receives signals from a communication cable. The equalization apparatus of the present invention employs signal equalization to compensate for the low pass characteristics of a communication cable. The scope of structure, application and employment of the present invention is not intended to be limited to the exemplary system discussed herein.

Communication systems include numerous communication links, each link involving one or more cables (or other transmission media). Transmission of a communication signal over a cable typically causes distortion of the signal. This distortion generally occurs as frequency dependent attenuation and variations in the signal which are affected by cable length, temperature, interconnection losses and other factors. The signal distortion is often manifested in inter-symbol interference. Data transmitted over a long length of cable at high data rates must be equalized in order to compensate for the loss and phase dispersion imposed by the low pass and other characteristics of the cable and other factors contributing to signal distortion. The extent to which the equalizer is able to match the inverse of the cable loss characteristics determines the extent to which inter-symbol interference induced by the cable distortions can be reduced.

There have been several attempts at providing appropriate signal equalization. Some attempts have sufficed for low speed communication systems having high voltage equipment, on the order of 5 volts and higher. There has been less success in providing an equalizer apparatus for operating at high speeds (for example, 1 gigabit per second or faster) in low voltage systems (for example, less than 3 volts).

Baker (U.S. Pat. No. 5,978,417 for "Adaptive Cable Equalizer", issued Nov. 2, 1999; and "An Adaptive Cable Equalizer for Serial Digital Video Rates to 400 Mb/s", IEEE Solid-State Circuits Conference Digest of Technical Papers; pp. 174–175, 1996) disclosed an equalizer apparatus suitable for operation with relatively low data rates, or speeds. Operation of Baker's apparatus at higher speeds (for example, approximately 1 gigabit per second) would not provide acceptable performance. Baker's apparatus provides gain control using current sources. Greater operating speeds and greater gains each contribute to Baker's apparatus requiring higher currents. Higher currents cause greater power dissipation that is manifested principally as increased heat. Higher heat contributes to lowered parts reliability or contributes to using more robust parts to withstand the heat. Thus, greater heat contributes to lowered reliability or to greater cost, and may contribute to both lower reliability and greater cost.

Shakiba (M. H. Shakiba, "A 2.5 Gb/s Adaptive Cable Equalizer", IEEE Solid-State Circuits Conference Digest of Technical Papers; pp. 396–397, 1999) improves performance over Baker regarding speed and power dissipation. However, Shakiba employs a differential amplifier structure to effect gain control using control voltage variance. The additional differential amplifier structure is connected in cascode with the existing structure. Variance of gain control is also referred to as tuning because one typically varies the gain of the high frequency signal components to offset high frequency losses caused by the low pass characteristic of the cable that delivered the signal being treated. As a consequence of the additional parts required for effecting gain control using control voltage variance, Shakiba requires a higher part count between his supply voltage and ground which means that there are a greater number of voltage drops between supply voltage and ground. This increased voltage drop in Shakiba's apparatus limits voltage headroom and adversely limits voltage swings that can be accommodated by his apparatus.

Cranford (U.S. Pat. No. 5,940,441 for "Integrated Adaptive Cable Equalizer Using a Continuous-Time Filter", issued Aug. 17, 1999), Babanezhad (U.S. Pat. No. 6,169,764 for "Analog Adaptive Line Equalizer", issued Jan. 2, 2001) and Gondi (S. Gondi, R. Geiger, J. Liu, J. Bareither, S. Sterrantino and E. Pace, "A 2V Low-Power 125 Mbaud Repeater Architecture for UTP5 Cables", European Solid-State Circuits Conference, September 2002) all employ feedback to implement their apparatuses [S. Gondi is the inventor of the present invention]. Feedback is known to create limitations with respect to stability. Whenever one employs feedback in a circuit, one must trade stability for speed of operation. Feedback is not conducive to high speed operations but is conducive to good linearity.

In the context of the present invention, linearity refers to characteristics of a circuit depending upon variance of input voltage levels. Some circuits become very nonlinear when large input signals are applied to them. Differential pair circuits are often non-linear. There are two common ways that non-linearity is reduced: (1) feedback and (2) degeneration. Feedback, as mentioned earlier herein, is not conducive to high speed operations. Degeneration refers to the use of introducing passive components (e.g., resistor or capacitor) at the source (or emitter) of a transistor. The present invention preferably employs degeneration to reduce non-linearity.

There is a need for an apparatus and method for equalizing input signals including high and low frequency signal components that may be advantageously employed in high speed, low voltage operations, with acceptable linearity.

There is a need for an apparatus and method for equalizing input signals including high and low frequency signal components that may be advantageously employed in high speed, low voltage operations and has ample voltage headroom to permit flexibility in operation and accommodate voltage swings in the input signals, with acceptable linearity.

SUMMARY OF THE INVENTION

An apparatus for equalizing input signals including high and low frequency component signals received at an input locus includes: (a) a first signal amplifying circuit coupled with the input locus, blocking the low frequency component signals and amplifying the high frequency component signals by a first gain to present a first amplified signal; the first gain is established by a relationship between at least two resistance elements in the first signal amplifying circuit; (b) a second signal amplifying circuit coupled with the input locus amplifying the input signal by a second gain to present a second amplified signal; the second gain being established by a relationship between at least two resistance elements in the second signal amplifying circuit; and (c) a combining circuit combining the first amplified signal and the second amplified signal to present an output signal representative of the input signal at an output locus.

A method for equalizing input signals including high frequency component signals and low frequency component signals received at an input locus includes the steps of: (a) in no particular order: (1) providing a first signal amplifying circuit coupled with the input locus; (2) providing a second signal amplifying circuit coupled with the input locus; the second gain being established by a relationship between at least two resistance elements in the second signal amplifying circuit; and (3) providing a combining circuit coupled with the first signal amplifying circuit and the second signal amplifying circuit; (b) operating the first signal amplifying circuit to block the low frequency component signals and to amplify the high frequency component signals by a first gain to present a first amplified signal; the first gain being established by a relationship between at least two resistance elements in the first signal amplifying circuit; (c) operating the second signal amplifying circuit to amplify the input signal by a second gain to present a second amplified signal; and (d) operating the combining circuit to combine the first amplified signal and the second amplified signal to present an output signal at an output locus; the output signal being representative of the input signal.

It is, therefore, an object of the present invention to provide an apparatus and method for equalizing input signals including high and low frequency signal components that may be advantageously employed in high speed, low voltage operations, with acceptable linearity.

It is a further object of the present invention to provide an apparatus and method for equalizing input signals including high and low frequency signal components that may be advantageously employed in high speed, low voltage operations and has ample voltage headroom to permit flexibility in operation and accommodate voltage swings in the input signals, with acceptable linearity.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
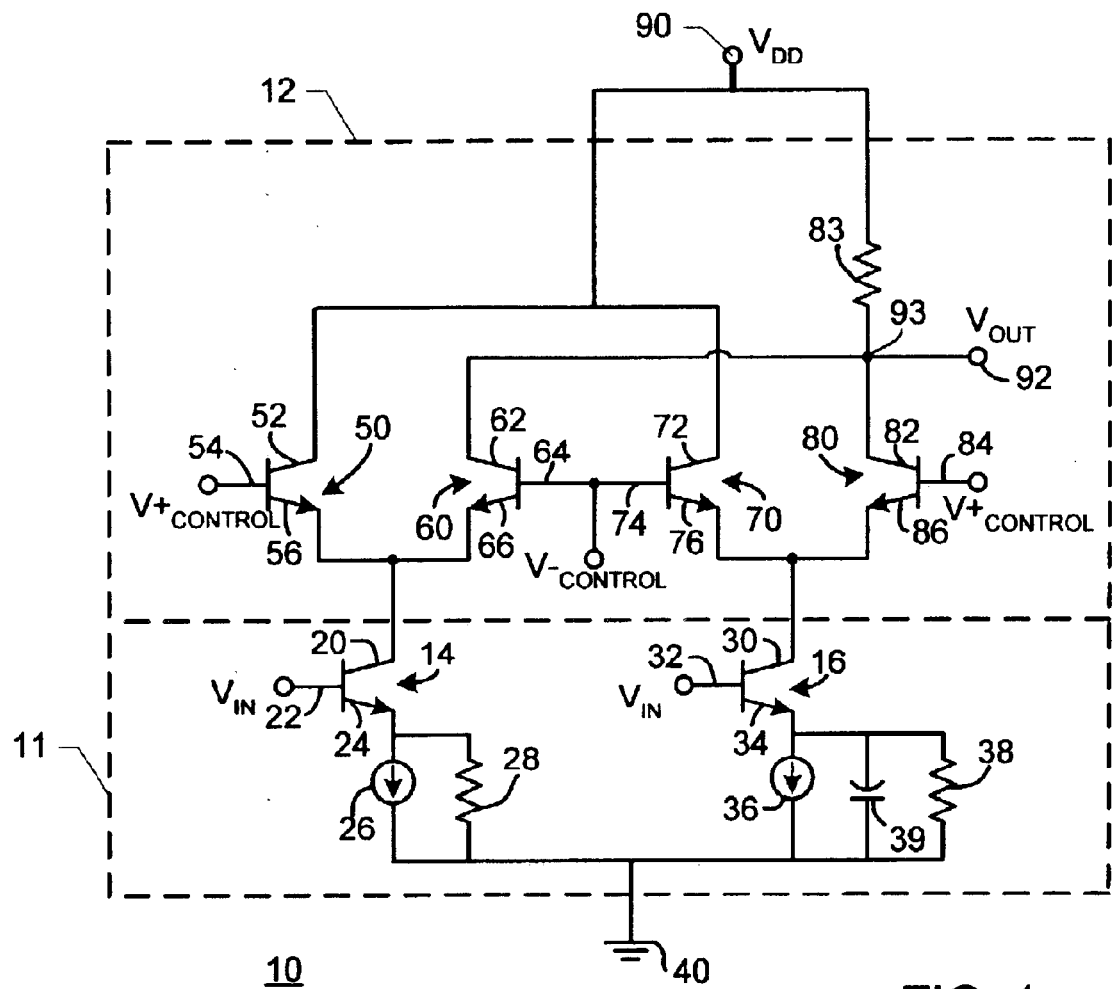
FIG. 1 is a simplified electronic schematic diagram of an exemplary prior art equalizer apparatus.

FIG. 1 is a simplified electronic schematic diagram of an exemplary prior art equalizer apparatus. In FIG. 1, an equalizer apparatus 10 includes a constant transconductance gain section 11 and a variable gain section 12. Variable gain section 12 employs differential control signals $V+_{CONTROL}$, $V-_{CONTROL}$ to control gain variance. Constant transconductance gain section 11 includes transistors 14, 16, current sources 26, 36, resistors 28, 38 and capacitor 39. Variable gain section 12 includes transistors 50, 60, 70, 80 and resistor 83. Transistor 14 has a collector 20, a base 22 and an emitter 24. Collector 20 is coupled with voltage-bias section 12. Emitter 24 is coupled with ground 40 via a current source 26 in parallel with a resistor 28. Transistor 16 has a collector 30, a base 32 and an emitter 34. Collector 30 is coupled with voltage-bias section 12. Emitter 34 is coupled with ground 40 via a current source 36 in parallel with a resistor 38 and a capacitor 39. An input signal $V_{IN}$ to equalizer apparatus 10 is received at bases 22, 32.

Variable gain section 12 controls biases on transistors 50, 60, 70, 80 to affect gains imposed upon signals traversing transistors 14, 16. Variable gain section 12 includes a transistor 50 having a collector 52, a base 54 and an emitter 56. Voltage-bias section 12 also includes a transistor 60 having a collector 62, a base 64 and an emitter 66; a transistor 70 having a collector 72, a base 74 and an emitter 76; and a transistor 80 having a collector 82, a base 84 and an emitter 86. A resistor 83 is coupled between collector 82 and a supply voltage locus 90 at which a supply voltage $V_{DD}$ is applied. Emitters 56, 66 are coupled with collector 20 of transistor 14. Emitters 76, 86 are coupled with collector 30 of transistor 16.

Collectors 62, 82 are coupled with an output locus 92 at which an output signal $V_{OUT}$ is presented. Collectors 62, 82 are commonly connected at a connection locus 93. In operation, a portion of current generated due to transconductance of transistor 14 and resistor 28 is diverted to connection locus 93 through transistor 60. Similarly, a portion of current generated due to transconductance of transistor 16, resistor 38 and capacitor 39 (resistor 38 and capacitor 39 are degenerated components) is diverted to connection locus 93 through transistor 80. The amounts of current diverted to connection locus 93 through transistors 50, 60, 70, 80 depends upon differential control signals $V+_{CONTROL}$, $V-_{CONTROL}$.

This signal handling scheme is designed to compensate for the low pass characteristics of the cable (or other signal conveying medium) by which input signals arrived at bases 22, 32. High frequency signal components that have been suppressed by the conveying cable (not shown in FIG. 1) are amplified at higher gain than low frequency signal components, thereby loosely matching the inverse of the cable loss characteristics to reduce inter-symbol interference induced by the cable distortions.

Signals traversing transistor 14 to output locus 92 (i.e., whole-spectrum signals) and signals traversing transistor 16 to output locus 92 (i.e., low frequency plus amplified high frequency signal components) are combined at connection locus 93. As a consequence, output signal $V_{OUT}$ presented at output locus 92 is a combination of low frequency signals and amplified high frequency signals. Constant transconductance gain section 11 provides a fixed difference in gains between the low frequencies and the high frequencies and variable gain section 12 provides variability of high frequency gain relative to the low frequency gain.

Equalizer apparatus 10 is substantially the equalizer disclosed by Shakiba, and suffers from the shortcomings discussed above in connection with the Shakiba apparatus. That is, equalizer apparatus 10 requires a high part count between supply voltage locus 90 and ground 40. This means that there are a number of voltage drops between supply voltage locus 90 and ground 40, which limits voltage headroom and adversely limits voltage swings that can be accommodated by equalizer apparatus 10.

Figure 2:
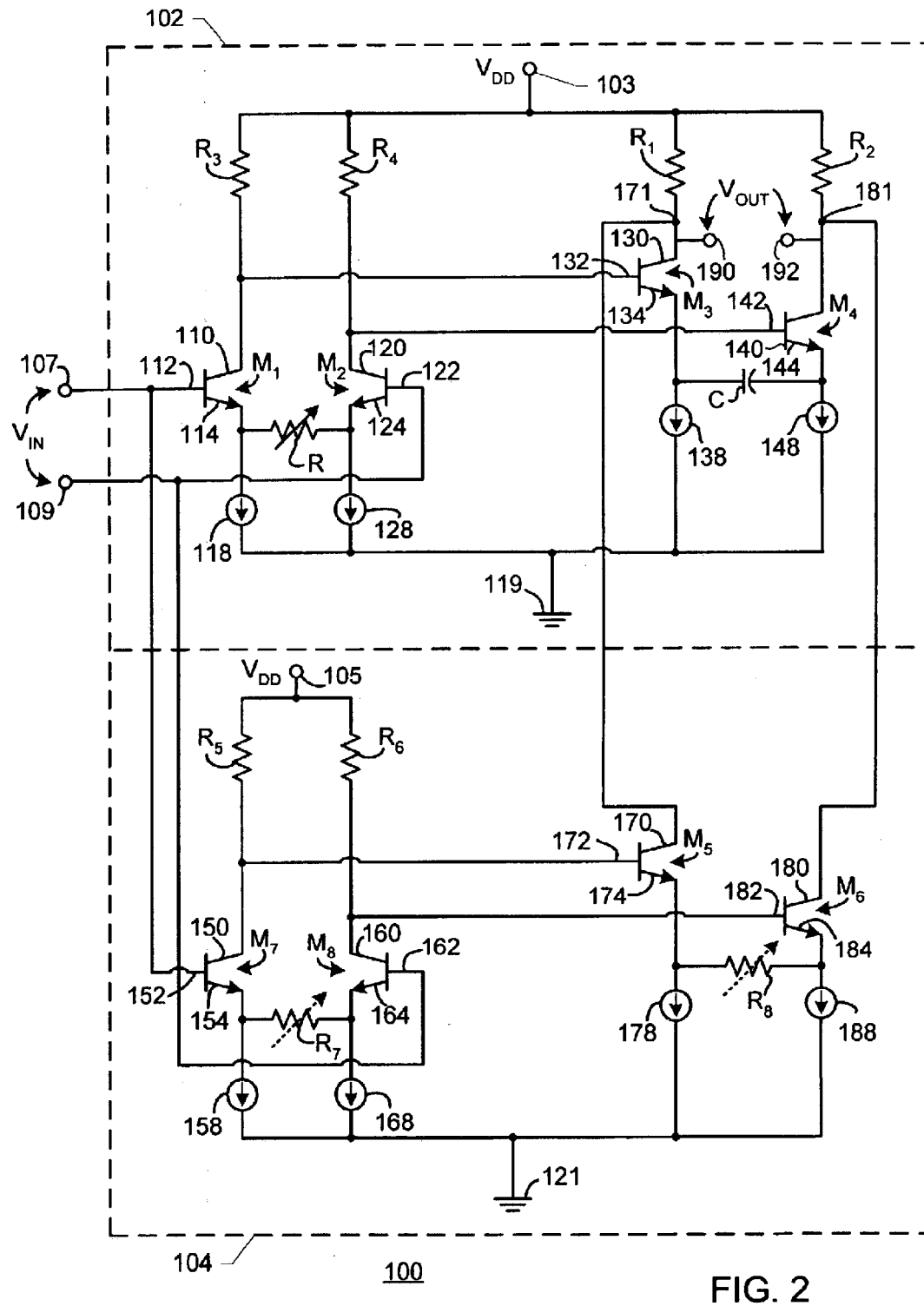
FIG. 2 is a simplified electronic schematic diagram of the apparatus of the present invention.

FIG. 2 is a simplified electronic schematic diagram of the apparatus of the present invention. In FIG. 2, an equalizer apparatus 100 includes a high frequency signal component section 102 and a whole-spectrum signal section 104. High frequency signal component section 102 includes a transistor $M_1$ having a collector 110, a base 112 and an emitter 114. A resistor $R_3$ is coupled between collector 110 and a supply voltage locus 103 at which a supply voltage $V_{DD}$ is provided. High frequency signal component section 102 also includes a transistor $M_2$ having a collector 120, a base 122 and an emitter 124. A resistor $R_4$ is coupled between collector 120 and supply voltage locus 103. Emitter 114 is coupled with ground 119 via a current source 118. Emitter 124 is coupled with ground 119 via a current source 128. Emitters 114, 124 are coupled together by a resistor R. Preferably resistor R is a variable resistor; variability of resistor R contributes to ease of tuning equalizer apparatus 100.

High frequency signal component section 102 further includes a transistor $M_3$ having a collector 130, a base 132 and an emitter 134. A resistor $R_1$ is coupled between collector 130 and supply voltage locus 103. High frequency signal component section 102 also includes a transistor $M_4$ having a collector 140, a base 142 and an emitter 144. A resistor $R_2$ is coupled between collector 140 and supply voltage locus 103. Emitter 134 is coupled with ground 119 via a current source 138. Emitter 144 is coupled with ground 119 via a current source 148. Emitters 134, 124 are coupled together by a capacitor C. Base 132 is coupled with collector 110. Base 142 is coupled with collector 120.

Whole-spectrum signal section 104 includes a transistor $M_7$ having a collector 150, a base 152 and an emitter 154. A resistor $R_5$ is coupled between collector 150 and a supply voltage locus 105 at which supply voltage $V_{DD}$ is provided. Whole-spectrum signal section 104 also includes a transistor $M_8$ having a collector 160, a base 162 and an emitter 164. A resistor $R_6$ is coupled between collector 160 and supply voltage locus 105. Emitter 154 is coupled with ground 121 via a current source 158. Emitter 164 is coupled with ground 121 via a current source 168. Emitters 154, 164 are coupled together by a resistor $R_7$. Resistor $R_7$ may be a variable resistor, as indicated by a dotted-line arrow associated with resistor $R_7$.

Whole-spectrum signal section 104 further includes a transistor $M_5$ having a collector 170, a base 172 and an emitter 174. Collector 170 is coupled with collector 130 at a combining locus 171. Whole-spectrum signal section 104 also includes a transistor $M_6$ having a collector 180, a base 182 and an emitter 184. Collector 180 is coupled with collector 140 at a combining locus 181. Emitter 174 is coupled with ground 121 via a current source 178. Emitter 184 is coupled with ground 121 via a current source 188. Emitters 174, 184 are coupled together by a resistor $R_8$. Resistor $R_8$ may be a variable resistor, as indicated by a dotted-line arrow associated with resistor $R_8$.

Input loci 107, 109 receive input signal $V_{IN}$. Input locus 107 is coupled with bases 112, 152. Input locus 109 is coupled with bases 122, 162. Output loci 190, 192 are coupled with collectors 130, 140, 170, 180 for presenting output signal $V_{OUT}$ from equalizer apparatus 100.

In operation, the gain of high frequency signal component section 102 is controlled by the ratio of values of resistors $R_4$, $$R\left(\text{i.e., } \frac{R_4}{R}\right).$$

The gain of whole-spectrum signal section 104 is controlled by the ratio of values of resistors $R_6$, $$R_7\left(\text{i.e., } \frac{R_6}{R_7}\right)$$

and by the ratio of values of resistors $R_2$, $$R_8\left(\text{i.e., } \frac{R_2}{R_8}\right).$$

The gain of high frequency signal component section 102 may be variable, and the gain of whole-spectrum signal section 104 may be variable. Capacitor C effectively blocks low frequency signals (including direct current (DC) signals) from traversing high frequency signal component section 102. As a consequence, equalizer apparatus 100 amplifies only high frequency components of input signal $V_{IN}$ received at input loci 107, 109. Equalizer apparatus 100 amplifies both high frequency components and low frequency components (i.e., the whole signal spectrum) of input signal $V_{IN}$ received at input loci 107, 109. Preferably the respective gains of high frequency signal component section 102 and whole-spectrum signal section 104 are different so that high frequency signal components of input signal $V_{IN}$ that traverse high frequency signal component section 102 are treated using a higher gain than is used in treating the whole-spectrum of input signal $V_{IN}$ traversing whole-spectrum signal section 104. This signal handling scheme is designed to compensate for the low pass characteristics of the cable (or other signal conveying medium) by which input signal $V_{IN}$ arrives at input loci 107, 109. High frequency signal components that have been suppressed by the conveying cable (not shown in FIG. 2) are amplified at higher gain than low frequency signal components, thereby approximating the inverse of the cable loss characteristics to reduce inter-symbol interference induced by the cable distortions.

Signals traversing whole-spectrum signal section 104 (i.e., whole-spectrum of input signal $V_{IN}$) and signals traversing high frequency signal component section 102 (i.e., high frequency signal components of input signal $V_{IN}$) are combined at combining loci 171, 181. As a consequence, output signal $V_{OUT}$ presented at output loci 190, 192 is a combination of whole-spectrum signals (amplified at a first gain, preferably a unity gain) and high frequency signal components (amplified at a second gain, preferably higher than the first gain).

The portion of high frequency signal component section 102 containing transistors $M_3$, $M_4$ essentially performs two functions: (1) Transistors $M_3$, $M_4$ provide a circuit path for applying input signal $V_{IN}$ across capacitor C (i.e., capacitively degenerated). This has the effect of limiting signals traversing high frequency signal component section 102 to high frequency signals; DC signals are blocked and low frequency signals are severely attenuated. (2) A current is generated by degeneration of transistors $M_5$, $M_6$ with resistor $R_8$ that is a representation of the whole spectrum signal. Similarly, a current is generated by degeneration of transistors $M_3$, $M_4$ with capacitor C that is a representation of the amplified high frequency signal components. These two currents are combined at combining loci 171, 181 and converted to a voltage by resistors $R_1$, $R_2$.

Equalizer apparatus 100 could be configured without using transistors $M_7$, $M_8$ and associated components such as resistor $R_7$ and current sources 158, 168. It is, however, preferred that those components be included in equalizer apparatus 100 to balance performance of high frequency signal component section 102 and whole-spectrum signal section 104. Such a balance of similar components serves to reduce the effect of parasitics and other circuit anomalies that are known to sometimes occur when using dissimilar circuit structures handling signals substantially in parallel.

One may mathematically describe equalizer apparatus 100 using a generalized expression for a transfer function:

$$T(s) = \frac{k \cdot \left(\frac{s}{z}+1\right)}{\left(\frac{s}{p}+1\right)} \quad [1]$$

Where
k=DC gain;
z=the zero of transfer function T(s); and
p=the pole of transfer function T(s).

Signals traversing high frequency signal component section 102 experiences transconductance expressed as:

$$\frac{i_1}{V_{in}} = \left(\frac{g_{m1} R_4}{1 + g_{m1}\frac{R}{2}}\right) \cdot \left(\frac{g_m}{1+\frac{g_m}{2cs}}\right) \quad [2]$$

Where
$g_{m1}$=transconductance of transistors M1 and M2;
R=Resistance of the indicated resistor in ohms; and
$g_m$=transconductance of transistors M3 and M4.

Assuming that $g_{m1}$ is sufficiently large Eqn. [2] reduces to:

$$\frac{i_1}{V_{in}} = \left(\frac{R_4}{\frac{R}{2}}\right) \cdot \left(\frac{g_m}{1+\frac{g_m}{2cs}}\right) \quad [3]$$

Signals traversing whole-spectrum signal section 104 (i.e., whole-spectrum of input signal $V_{IN}$) experience a substantially DC signal path having a transconductance that may be expressed as:

$$\frac{i_1}{V_{in}} = \left(\frac{1}{\frac{R_8}{2}}\right) \quad [4]$$

Assuming $$R_5 = R_6 = \frac{R_7}{2},$$

combining Eqns. [3] and [4] indicates net transconductance for signals traversing both sections 102, 104 of equalizer apparatus 100:

$$\frac{i_{net}}{V_{in}} = \left(\frac{R_4}{\frac{R}{2}}\right) \cdot \left(\frac{g_m}{1+\frac{g_m}{2cs}}\right) + \left(\frac{1}{\frac{R_8}{2}}\right) \quad [5]$$

The corresponding voltage gain is:

$$\frac{V_{out}}{V_{in}} = \left(\frac{R_4 R_2}{\frac{R}{2}}\right) \cdot \left(\frac{g_m}{1+\frac{g_m}{2cs}}\right) + \left(\frac{R_2}{\frac{R_8}{2}}\right) \quad [6]$$

Since $$R_2 = \frac{R_8}{2},$$

Eqn. [6] may be rewritten:

$$\frac{V_{out}}{V_{in}} = \left(\frac{R_4 R_2}{\frac{R}{2}}\right) \cdot \left(\frac{g_m}{1+\frac{g_m}{2cs}}\right) + 1 \quad [7]$$

Eqn. [7] may be rewritten as:

$$\frac{V_{out}}{V_{in}} = \left(\frac{1}{R}\right) \cdot \left(\frac{4cs R_4 R_2 g_m + 2cs R + R g_m}{2cs + g_m}\right) \quad [8]$$

From Eqn. [8] the pole and zero are given as:

$$\text{Pole is at } -\frac{g_m}{2c} \quad [9]$$

$$\text{Zero is at } -\frac{g_m}{2c\left(\frac{2g_m R_4 R_2}{R}+1\right)} \quad [10]$$

The fact that the sign of the pole (Eqn. [9]) is negative means that the pole is in the left side of the s-plane, and since no feedback is employed in the circuit, the circuit is therefore inherently stable. Moreover, because the zero is less than the value of the pole (as indicated by the denominator of Eqn. [10] being greater than the denominator of Eqn. [9]), assures that there will be high frequency gain of signals traversing equalizer apparatus 10.

Equalizer apparatus 100 is capable of operating at low voltages and high speeds with an amplification gain controlled by the ratio of resistors $$\frac{R_4}{R}.$$

Such resistor-controlled gain yields lower power dissipation than is experienced by current-controlled gain (as in Baker's apparatus) and is less cumbersome and bulky than circuitry using voltage-controlled gain (as in Shakiba's apparatus).

FIG. 2 discloses the apparatus of the present invention in its preferred embodiment as a first order circuit. Second or higher order circuits may be employed to effect equalization of signals using additional high frequency signal component sections tuned to amplify designated partitions or frequency bands of the high frequency portions of a received signal. Capacitor C (FIG. 4) is the primary determinant of the frequency partition or band that is amplified by a respective additional high frequency signal component section.

Figure 3:
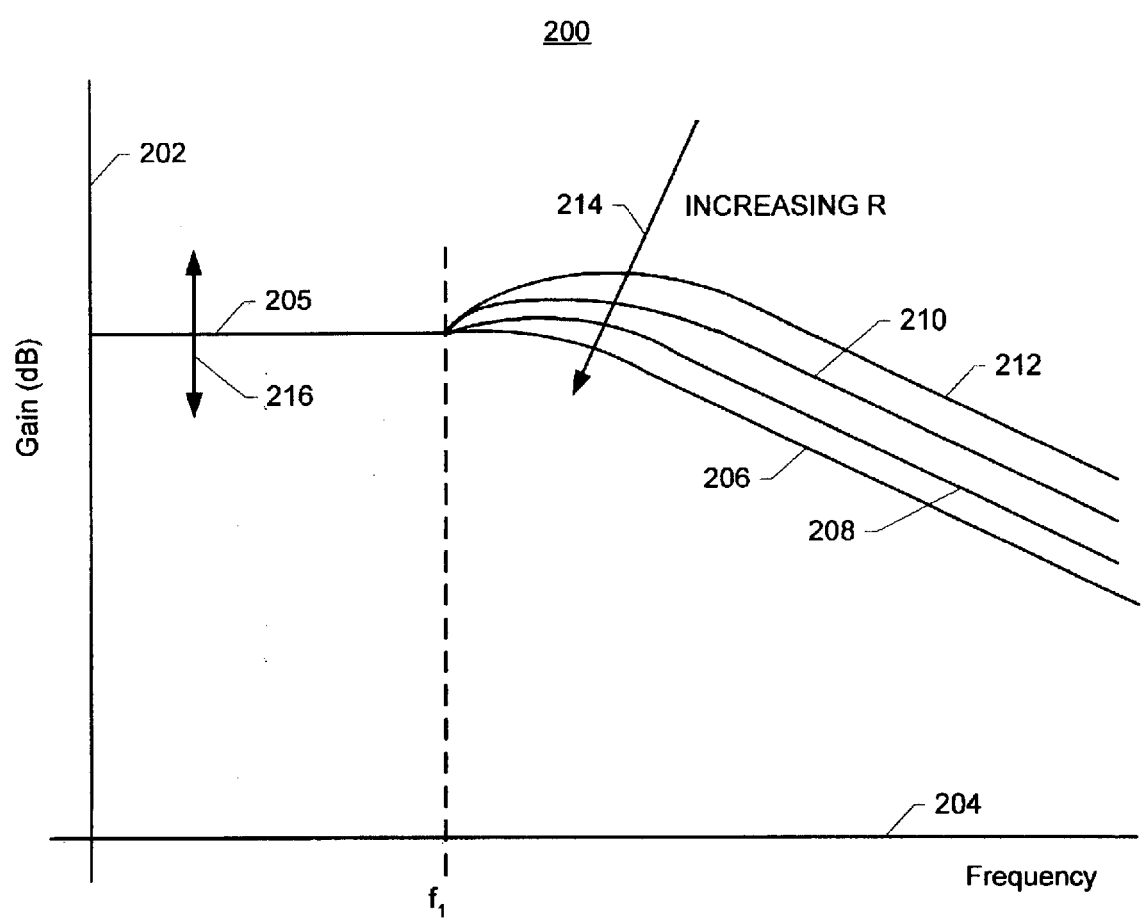
FIG. 3 is a graphic representation illustrating gain response as a function of frequency for the apparatus of the present invention.

FIG. 3 is a graphic representation illustrating gain response as a function of frequency for the apparatus of the present invention. In FIG. 3, a graphic plot 200 indicates response of gain, represented on an axis 202, as a function of frequency, represented on an axis 204, in an equalizer apparatus configured according to the present invention. A response curve 205 represents substantially constant gain with respect to frequency up to approximately frequency $f_1$. There is a small influence on curve 205 below frequency $f_1$ by the ratio $$\frac{R4}{R}$$

(FIG. 2) which operates to lessen abrupt changes in curve 205 at frequency $f_1$. Above frequency $f_1$, gain varies according to the ratio $$\frac{R_4}{R}$$

(FIG. 2). A variety of response curve extensions of curve 205 that vary according to the ratio $$\frac{R_4}{R}$$

is indicated in FIG. 3 as curve extensions 206, 208, 210, 212. As indicated by an arrow 214 in FIG. 3, as one increases the value of R (FIG. 2), thereby reducing the value of the ratio $$\frac{R_4}{R},$$

curve extensions of curve 205 successively demonstrate a smoother transition for frequencies above frequency $f_1$, as manifested by a lesser deviation in the vicinity of frequency $f_1$.

Figure 4:
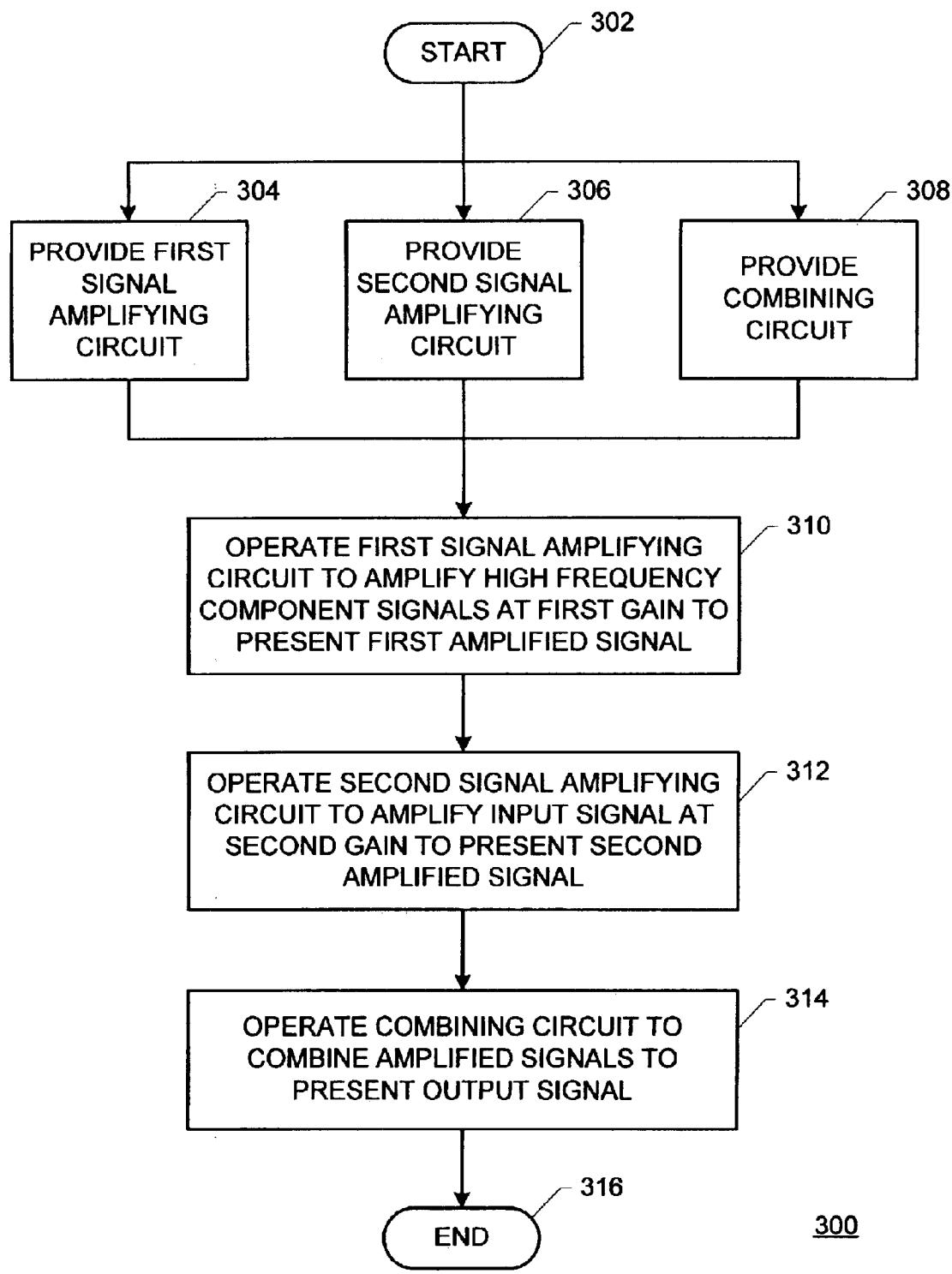
FIG. 4 is a flow diagram illustrating the method of the present invention.

FIG. 4 is a flow diagram illustrating the method of the present invention. In FIG. 4, a method 300 for equalizing input signals including high frequency component signals and low frequency component signals received at an input locus begins at a START locus 302. Method 300 continues with, in no particular order, (1) providing a first signal amplifying circuit coupled with the input locus, as indicated by a block 304; (2) providing a second signal amplifying circuit coupled with the input locus, as indicated by a block 306; and (3) providing a combining circuit coupled with the first signal amplifying circuit and the second signal amplifying circuit, as indicated by a block 308.

Method 300 continues by operating the first signal amplifying circuit to block the low frequency component signals and to amplify the high frequency component signals by a first gain to present a first amplified signal, as represented by a block 310. The first gain is established by a relationship between at least two resistance elements in the first signal amplifying circuit. Method 300 continues by operating the second signal amplifying circuit to amplify the input signal by a second gain to present a second amplified signal, as represented by a block 312. Preferably, the second gain is established by a relationship between at least two resistance elements in the second signal amplifying circuit. Method 300 continues by operating the combining circuit to combine the first amplified signal and the second amplified signal to present an output signal representative of the input signal at an output locus, as represented by a block 314. Method 300 terminates at an END locus 316.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. A high speed line equalizer apparatus comprising:
   (a) a first signal treating circuit coupled with an input locus for receiving an input signal; said input signal including a spectrum of component signals; said spectrum of component signals including high frequency component signals and low frequency component signals; said first signal treating circuit amplifying said high frequency component signals by a first gain to present amplified high frequency component signals; said first gain being established by a relationship between at least two impedance elements in said first signal treating circuit;
   (b) a second signal treating circuit coupled with said input locus for receiving said input signal; said second signal treating circuit amplifying said spectrum of component signals by a second gain to present amplified whole spectrum component signals; and
   (c) a combining circuit for receiving said amplified high frequency component signals and said amplified whole spectrum signals; said combining circuit using said amplified high frequency component signals and said amplified whole spectrum signals to present an output signal; said output signal being representative of said input signal.

2. A high speed line equalizer apparatus as recited in claim 1 wherein said first gain is greater than one and wherein said second gain is variable.

3. A high speed line equalizer apparatus as recited in claim 1 wherein said first signal treating circuit includes a plurality of signal treating sections; each respective signal treating section of said plurality of signal treating sections amplifying said high frequency component signals in a respective different high frequency band.

4. A high speed line equalizer apparatus as recited in claim 3 wherein said first gain is greater than one and wherein said second gain is variable.

5. A high speed line equalizer apparatus as recited in claim 1 wherein said first signal treating circuit and said second signal treating circuit are configured using generally similar component circuitry to minimize asymmetric treatment of said high frequency component signals and said low frequency component signals.

6. A high speed line equalizer apparatus as recited in claim 5 wherein said first gain is greater than one and wherein said second gain is variable.

7. An apparatus for equalizing input signals received at an input locus; said input signals including high frequency component signals and low frequency component signals; the apparatus comprising:
   (a) a first signal amplifying circuit coupled with said input locus; said first signal amplifying circuit blocking said low frequency component signals and amplifying said high frequency component signals by a first gain to present a first amplified signal; said first gain being established by a relationship between at least two resistance elements in said first signal amplifying circuit;
   (b) a second signal amplifying circuit coupled with said input locus; said second signal amplifying circuit amplifying said input signal by a second gain to present a second amplified signal; and
   (c) a combining circuit for combining said first amplified signal and said second amplified signal to present an output signal at an output locus; said output signal being representative of said input signal.

8. An apparatus for equalizing input signals received at an input locus as recited in claim 7 wherein said first gain is greater than one and wherein said second gain is variable.

9. An apparatus for equalizing input signals received at an input locus as recited in claim 7 wherein said first signal amplifying circuit includes a plurality of signal amplifying sections; each respective signal amplifying section of said plurality of signal amplifying sections amplifying said high frequency component signals in a respective different high frequency band.

10. An apparatus for equalizing input signals received at an input locus as recited in claim 9 wherein said first gain is greater than one and wherein said second gain is variable.

11. An apparatus for equalizing input signals received at an input locus as recited in claim 7 wherein said first signal amplifying circuit and said second signal amplifying circuit are configured using generally similar component circuitry to minimize asymmetry in treatment of said high frequency component signals by said first signal amplifying circuit and treatment of said input signal by said second signal amplifying circuit.

12. An apparatus for equalizing input signals received at an input locus as recited in claim 11 wherein said first gain is greater than one and wherein said second gain is variable.

13. A method for equalizing input signals received at an input locus; said input signals including high frequency component signals and low frequency component signals; the method comprising the steps of:
  (a) in no particular order:
    (1) providing a first signal amplifying circuit coupled with said input locus;
    (2) providing a second signal amplifying circuit coupled with said input locus; and
    (3) providing a combining circuit coupled with said first signal amplifying circuit and said second signal amplifying circuit;
  (b) operating said first signal amplifying circuit to block said low frequency component signals and to amplify said high frequency component signals by a first gain to present a first amplified signal; said first gain being established by a relationship between at least two resistance elements in said first signal amplifying circuit;
  (c) operating said second signal amplifying circuit to amplify said input signal by a second gain to present a second amplified signal; and
  (d) operating said combining circuit to combine said first amplified signal and said second amplified signal to present an output signal at an output locus; said output signal being representative of said input signal.

14. A method for equalizing input signals received at an input locus as recited in claim 13 wherein said second gain is established by a relationship between at least two resistance elements in said second signal amplifying circuit.

15. A method for equalizing input signals received at an input locus as recited in claim 13 wherein said first gain is greater than one and wherein said second gain is variable.

16. A method for equalizing input signals received at an input locus as recited in claim 13 wherein said first signal amplifying circuit includes a plurality of signal amplifying sections; each respective signal amplifying section of said plurality of signal amplifying sections amplifying said high frequency component signals in a respective different high frequency band.

17. A method for equalizing input signals received at an input locus as recited in claim 16 wherein said first gain is greater than one and wherein said second gain is variable.

18. A method for equalizing input signals received at an input locus as recited in claim 13 wherein said first signal amplifying circuit and said second signal amplifying circuit are configured using generally similar component circuitry to minimize asymmetry in treatment of said high frequency component signals by said first signal amplifying circuit and treatment of said input signal by said second signal amplifying circuit.

19. A method for equalizing input signals received at an input locus as recited in claim 18 wherein said first gain is greater than one and wherein said second gain is variable.

* * * * *